United States Patent Office 3,486,824
Patented Dec. 30, 1969

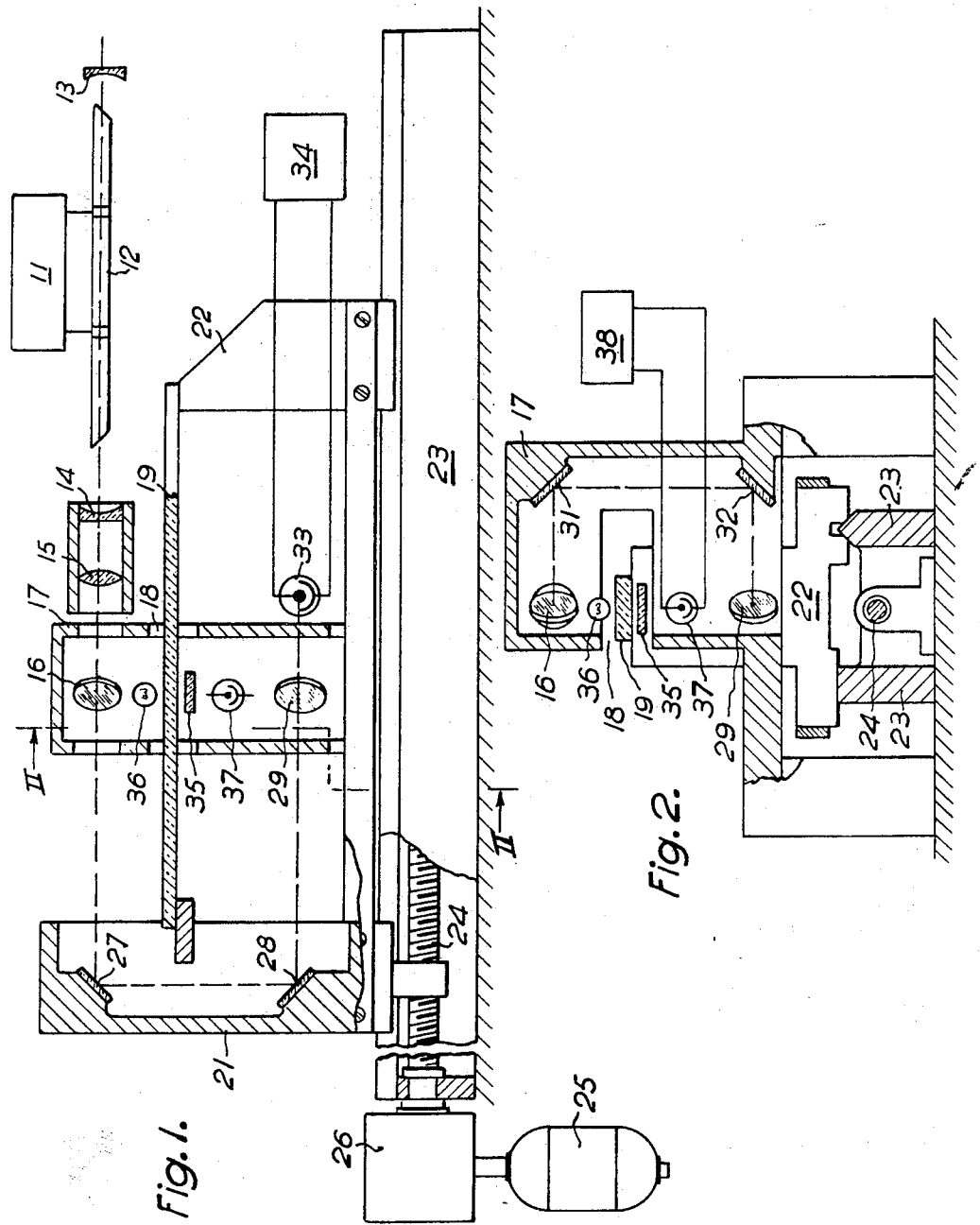

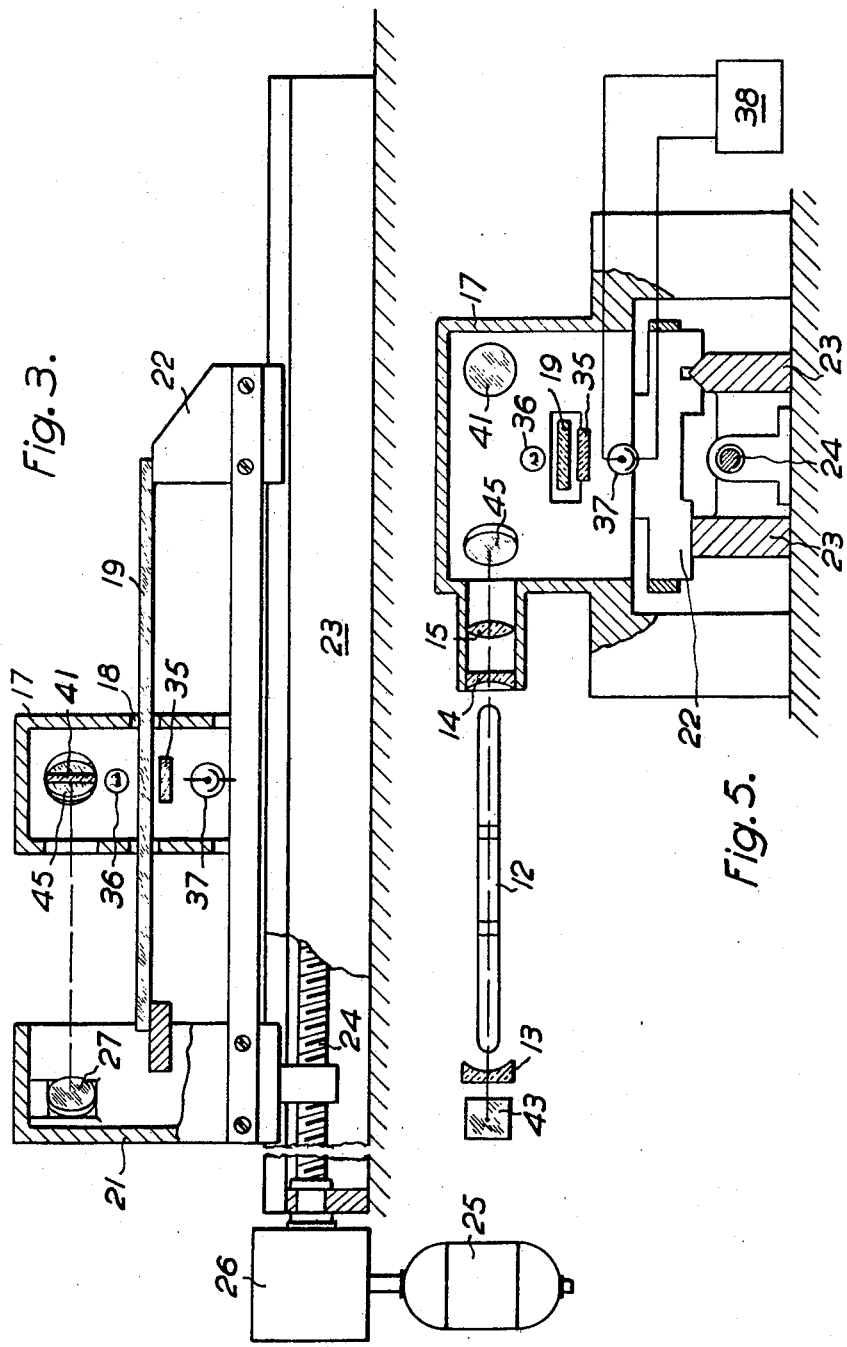

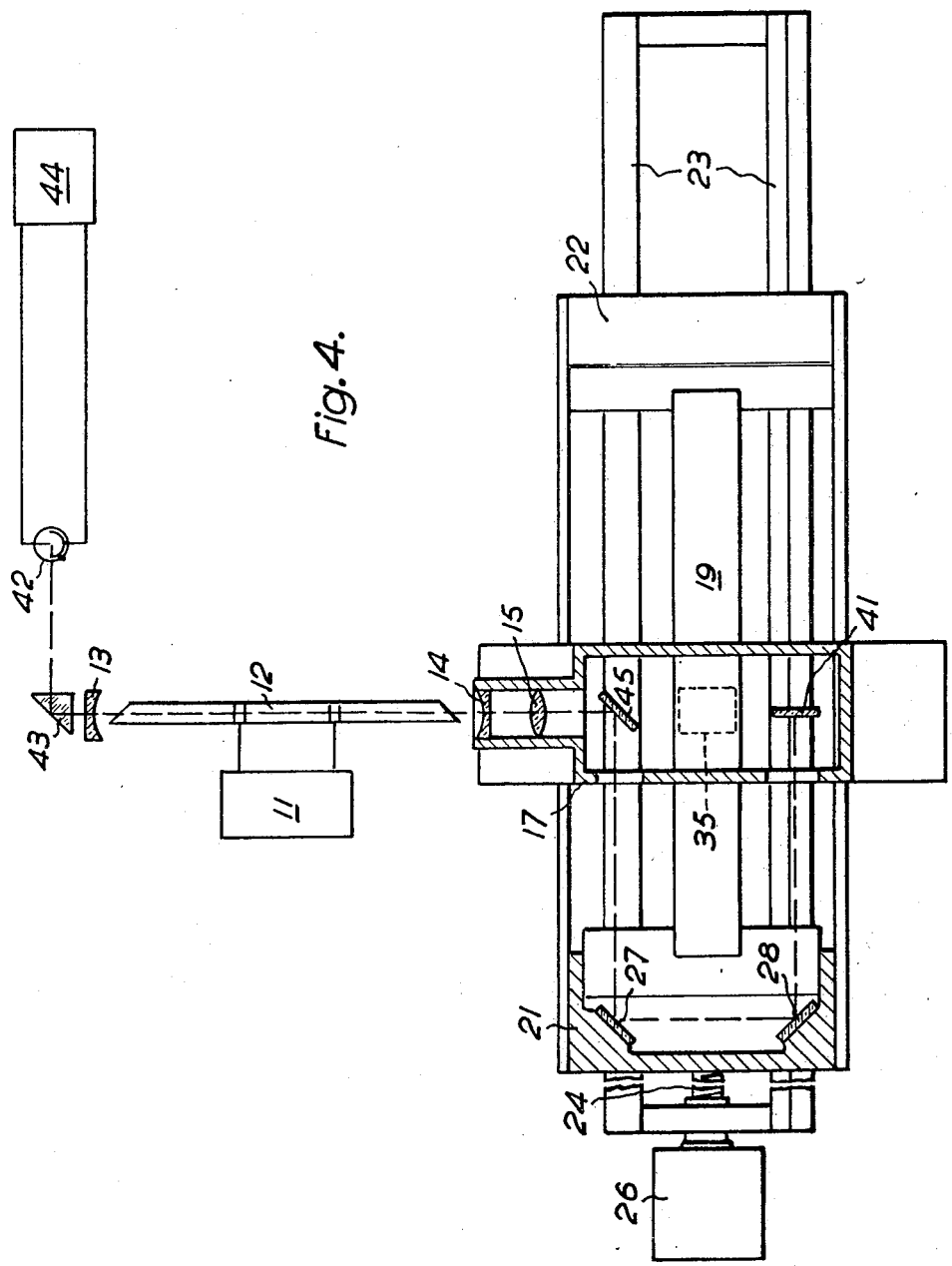

3,486,824
SYSTEM FOR THE MEASUREMENT OF SCALE DIVISIONS INCLUDING A MIRROR LOCATED EXTERNAL TO AN OPTICAL MASER CAVITY
Alan Hugh Cook, William Richard Charlton Rowley, Victor William Stanley, David Charles Wilson, and Robert George Hitchins, Teddington, Middlesex, England, assignors to National Research Development Corporation, London, England, a corporation of Great Britain
Filed May 7, 1964, Ser. No. 365,762
Claims priority, application Great Britain, May 8, 1963, 18,271/63
Int. Cl. G01b 9/02, 11/14
U.S. Cl. 356—106                6 Claims

ABSTRACT OF THE DISCLOSURE

A laser produces an interference effect dependent on displacement of a carriage, the cycles are counted, and the count compared with another count made by scanning the divisions of a scale in known relationship to the displacement of the carriage. The interference may be within the laser produced by reflecting part of the emission back into the lasing medium by a mirror which may be fixed, when the carriage carries optical elements which vary the path length of the beam, or may be carried by the carriage. The scanning may be by the same carriage or another carriage linked to move in predetermined relationship to the first carriage. The count of the divisions may be by an index grating and photoelectric cell excited by moire fringes.

---

This invention relates to the measurement of scale divisions by interferometric methods, which being based on the wave length of light are capable of high accuracy and of dealing with smaller intervals than are usually needed with a practical scale.

An important requirement is that the wave length of the source of light should be known and should not vary during the measurement which may be a slow process. It would also be desirable that the apparatus should be effective over a substantial length of scale which calls for a source providing radiation of high coherence.

An optical maser (or laser) provides radiation the wave length of which is ascertainable, very stable and highly coherent and in its broadest aspect the invention consists in an interferometric apparatus for the measurement of scale divisions in which the light source is an optical maser.

The rest of the interferometer may be of known construction in which the interference is produced between two beams derived from the source one of which is of constant length and the other of which is varied in known relationship to the scale divisions under measurement, but the invention also provides a lay-out which enables the desirable properties of an optical maser to be turned to account.

The invention also provides novel arrangements of interferometer which while turning to account the above mentioned qualities of the radiation provided by an optical maser also makes use of the fact that if such a maser is continuously operated, the maser action is wholly or partially suppressed if light is reflected back into the maser from an external mirror, for mirror positions along the direction of radiation separated by half-wave lengths of that radiation, in other words the interference takes place within the maser.

The use of an optical maser also enables a very simple optical system to be used in all the arrangements of interferometer provided by the invention.

Figure 6:
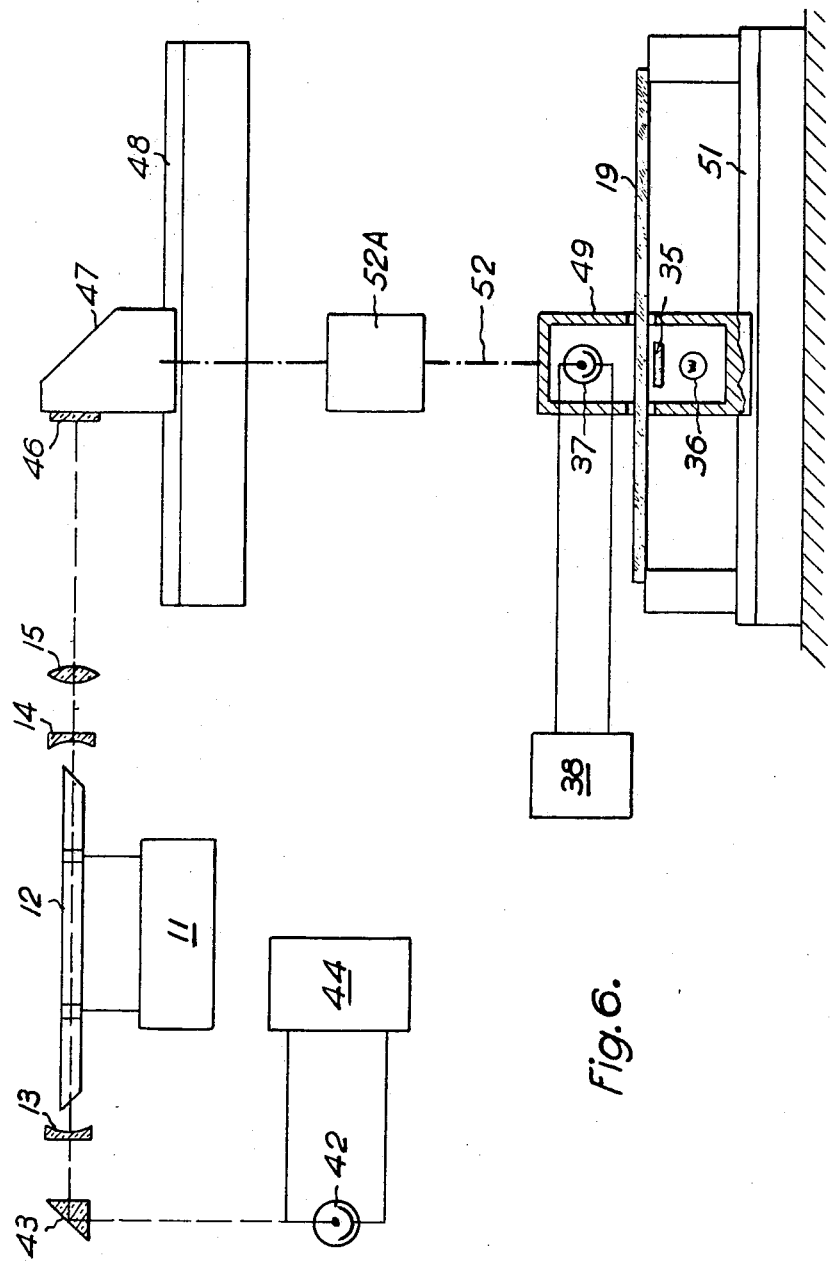

The invention will be further described with reference to the accompanying highly diagrammatic drawings in which:

FIGURE 1 is a side view with some parts in section of an apparatus in which the interference is effected outside the optical maser, FIGURE 2 is an end view partly in section taken on the line II—II of FIGURE 1, FIGURE 3 is a side view with some parts in section of a second form of apparatus in which the interference is effected inside the optical maser, FIGURE 4 is a plan view of FIGURE 3 with some parts in section, FIGURE 5 is an end view of FIGURE 3 with some parts in section, FIGURE 6 is a diagram of a modification of the apparatus shown in FIGURES 3 to 5, FIGURE 7 is a diagram of another modification of the apparatus shown in FIGURES 3–5.

The drawings have been kept highly diagrammatic to save burdening them with unnecessary detail, the practical requirements which such apparatus has to satisfy and the manner in which such apparatus is constructed is detail being well known to those skilled in the art.

Referring now to FIGURES 1 and 2, 11 indicates in block form an oscillator which excites an optical gas maser tube 12. The mirrors 13 and 14 together form an optical resonator which coacts with tube 12. They are highly reflecting but at least the mirror 14 is not completely reflecting, so that some radiation may be extracted. Light passing through mirror 14 is directed on a beam splitter 16 (semi-transparent reflector) the two beams from which are of approximately equal intensity, and are ultimately recombined as will be described. The light emitted by the maser is in a concentrated beam which diverges only slowly, but it is advantageous to provide a lens 15 to collimate the beam, especially if the total path is more than one or two feet.

The splitter 16 is carried in a stationary supporting framework 17 having a gap 18 to clear the scale 19 under test. The latter is mounted so that it can be moved smoothly longitudinally and accurately parallel to the beam falling on the splitter 16 for which purpose it is shown supported at its ends by a main carriage 21 and an auxiliary carriage 22 coupled together and running on ways 23; in practice the scale may need to be supported at other points along its length but such intermediate supports have not been shown to avoid unnecessary complication of the drawing. Care must also be taken that temperature effects are prevented from distorting the scale 19. The carriages and hence the scale can be displaced by any convenient known means of translation such as a piston in a cylinder actuated by oil or air pressure, or by means of a screw here exemplified by a lead screw 24 rotated by any convenient means such as an electric motor 25 driving through a reducing gear 26.

From the beam splitter 16 one beam continues in its original direction to a mirror 27 on the carriage 21, whence it is redirected conveniently through a right angle on to a further mirror 28 which redirects it accurately parallel to its original direction. From this it reaches a combining member 29 in the framework 17, which again is a semi-transparent reflector and may therefore conveniently, if not accurately as regards function, be referred to as a beam splitter. The parts are arranged so that the plane in which the beam lies passes through the axis of the scale 19, and the axis of the scale is midway between the beams. The length of the path from the splitter 16 to the splitter 29 via the mirrors 27, 28 changes by twice the amount the carriages 21, 22, move.

The other, reflected beam from the splitter 16 reaches the splitter 29 via two further mirrors 31, 32 and they and the two splitters are arranged so that the beam directed by them is aligned with that arriving at the splitter 29 from the mirror 28.

It will be seen that the splitters 16, 29 and the mirrors 31 and 32 are mounted independently of the ways 23 so that their relative positions are not affected by any distortions of the base bearing the ways and other parts of the apparatus.

As the carriages 21, 22 are displaced, and as the two beams which are combined at the splitter 29 are derived from the same coherent source, the intensity of the combined beam rises and falls cyclically with a pitch interval of half a wave length, due to interference and thus forms a measure of the displacement of the carriage, as will be well understood by those skilled in the art. Accordingly counting these cycles and fraction of a cycle constitutes a measure of the distance moved. To detect the variations the combined beam is directed on to a photo-electric cell 33, a further redirecting mirror or mirrors being interposed if the general lay-out makes this necessary or desirable. The cell operates a counter, indicated diagrammatically by block 34.

To enable the scale 19 to be tested, the passage of its divisions past an index must also be counted and at the instants of this passage, the count of cycles and fraction of a cycle on counter 34 must be compared with the count of the scale divisions. If the scale 19 is an optical transmission grating, the index can conveniently consist of a reference grating 35 of short length, the properties of which are known. This is supported in the framework 17, set so that between them the gratings 19 and 35 produce moire fringes which are observed by means of light source 36 and a photo-electric cell 37, both mounted in the framework 17. The cell 37 operates a second counter 38. Counters 34 and 38 may additionally be provided with means for determining fractional parts of counts. The mounting of the parts 16, 29, 31, 32 in close proximity in a common framework 17 minimises the effects of variations of the ambient temperature on their relative position.

Even if the scale 19 is a grating of fine pitch, since the wave length of the radiation is small compared with the pitch of the grating, the count recorded at 34 will be much larger than that at 38. Also, the count at 34 will indicate very accurately the distance moved by the scale 19 since the wave length of the radiation generated by an optical maser is very stable. This is especially true if the wave length is stabilised as described in application Ser. No. 365,831 filed May 7, 1964 for Control of Optical Masers or Lasers. There may well be hundreds or thousands of counts at 34 between successive counts at 38; thus any variation in the spacing of grating 19 will be shown up by variations in the corresponding counts at 38. It is then desirable to record, for example on perforated paper tape, the number of counts at 34, including perhaps fractional parts, for each successive or each preselected count at 38.

In the example illustrated in FIGURES 3, 4 and 5 the interference takes place within the maser itself. The parts 11, 12, 13, 14, 15 are the same as in FIGURES 1 and 2 but in this case the mirror 14 is also not completely reflecting so that some radiation can be extracted from it and the mirror 14 and the lens 15 are now also mounted in the framework 17. There are also two linked carriages 21, 22 supporting the scale 19 to be tested running on ways 23 and displaced by suitable translating means exemplified again by a motor 25, gear box 26 and lead screw 24. There is a stationary supporting framework with a gap 18 and a reference grating 35, light source 36, photo-electric cell 37 and counter 38 to count the passage of the scale divisions. The carriage 21 also carries the two mirrors 27, 28.

In this case however the beam from the maser through the mirror 14 and lens 15 does not pass through a beam splitter before reaching the mirror 27 in a direction parallel to the axis of the scale 19, and the beam after redirection by the mirror 28 in a direction parallel to the axis of the scale does not fall on a further splitter, but on a plane mirror 41 set normal to the beam so that the latter return on its own path and re-enters the maser tube 12. As the carriages 21, 22 move the length of path of this beam changes and accordingly the phase of the radiation re-entering the tube. When the back reflected radiation is in antiphase with the radiation being emitted from tube 12, the generation of radiation is wholly or partially suppressed. This suppression occurs at every half-wave change of length of the path of the beam, alternating with periods of full generation. This cyclic variation is detected in this case through the mirror 13 by a photo-electric cell 42, after re-direction if necessary, for example by a reflecting prism 43. The cell 42 operates a counter, indicated diagrammatically by block 44 which counts whole numbers and fractions of cycles. Thus the accuracy of the scale is tested as before by comparison of the counters 38 and 44, and the same provision for practical interpretation and recording a punched tape may be made.

Differing from FIGURES 1 and 2, the tube 12 is shown set transversely with respect to the length of the scale 19, necessitating a further mirror 45 to redirect the beam parallel with the axis of the scale but this is a matter of convenience and the tube 12 could be arranged to present the beam in the required direction, just as the tube 12 could be arranged transversely and a further mirror be provided in FIGURES 1 and 2. Again in FIGURES 1 and 2 the plane in which the beam to and from and between the mirrors 27 and 28 lies is vertical, while in FIGURES 3 to 5 it is horizontal but this is a matter of convenience and any other arrangement can be used provided the plane contains the axis of the scale and the two paths between the carriage 21 and the framework 17 are accurately parallel to the axis of the scale and symmetrically disposed about it.

In both the embodiments above described with reference to FIGURES 1 to 5, since the mirrors 27, 28 the position of which determines the length of path of the light used to provide the reference count, move with the scale, there is a direct fixed relationship between the reference count and the displacement of the scale, and the scale must be straight and move in the same direction as the mirrors.

Figure 7:
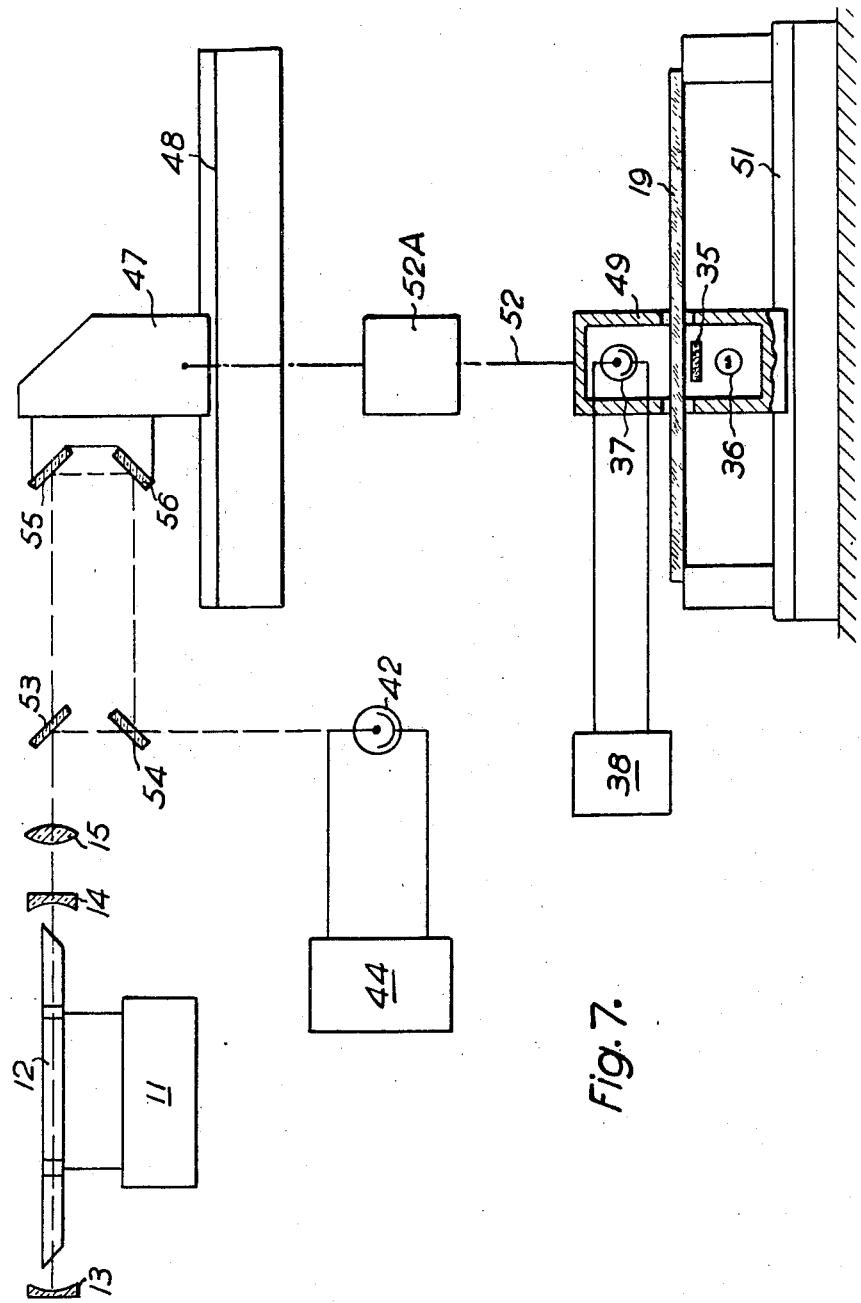

If some change in scale is required, or a different relative direction of displacement or the scale is not straight but for example circular, the arrangements illustrated in principle in FIGURES 6 and 7 may be used.

In the arrangement shown in FIGURE 6 the interference takes place within the optical cavity of the maser tube 12 as in FIGURES 3, 4 and 5 so that the radiation passing through the mirror 14 and lens 15 is returned along its original path by the aid of a mirror 46 (FIGURE 6) normal to the beam, while counting of the interference fringes is affected by allowing radiation passing through the mirror 13 to fall on a photo-electric cell 42 which operates a counter 44, but differing from the embodiment of FIGURES 3 to 5, the mirror 46 is not fixed but is mounted on a carriage 47 running on ways 48 accurately parallel to the beam falling on the mirror 46.

In the arrangement shown in FIGURE 7 the beam splitters 53 and 54 are fixed and two mirrors 55 and 56 are mounted on the carriage 47. Interference now takes place between the beam passing through the splitter 53 and travelling via the mirrors 55 and 56 back to the beam splitter 54, and the beam reflected at the splitter 53 and passing through the splitter 54. The recombination of the two beams now falls on the photo-electric cell 42 and is counted by the counter 44.

In both FIGURES 6 and 7 the scale 19 to be tested is also fixed, while the index constituted by the reference grating 35 moves in relation to the scale 19 by the aid of a carriage 49 running on ways 51, the movement of the grating 35 being precisely related to that of the carriage 46. This is indicated by a link 52 which is shown to include a block 52A, which indicates any speed or direction changing device that may have to be included. Such change of direction may be used to introduce a change in scale as in British patent application No. 22,635/63 or it may include a change in the nature of the movement, as would be necessary for example in investigating a radial grating, where e.g. a rack and pinion might be used. If conditions allow however direct connection is the most desirable when the mirror 46 and grating 35 can be mounted on the same carriage running on the same ways under the action of a single lead screw. However when direct connection suits the condition, the embodiments of FIGURES 1 to 5 are to be preferred because they are unaffected by slight inaccuracies in the straightness of the ways, whereas in the embodiment of FIGURE 6 such inaccuracies give rise to sine error, also various parts which need to be fixed relative to one another are further apart and thus more likely to be disturbed by temperature effects.

Whereas in FIGURES 3 to 6 the interference takes place in the optical cavity of the maser, it is not essential that the whole radiation falling on the mirror 41 or 45 should be returned to the maser, as the desired periodic suppression of the emitted radiation is readily achieved when the intensity of the beam returned to the maser is only a small proportion, for example 10 percent of the emitted beam. This intensity reduction may easily be made by inserting an optical filter into the beam or making the mirror 41 or 46 of suitably low reflectivity, and is of some advantage as it reduces the disturbing effect caused by multiple reflections between the mirrors 14 and 41 or 46.

It is important in the embodiment shown in FIGURE 6 that the mirror 14 should be rigidly fixed in relation to the rest of the interferometric system. The same degree of rigidity of mirror 14 is not necessary in the embodiment shown in FIGURE 7.

The invention has been above described with reference to the particular case of an optical grating as the scale, but it can also be employed on metrological scales on which the ruling is much less frequent e.g. on metal bars or tapes. In such cases it will not usually be possible to employ moire fringes but other devices which will respond with sufficient accuracy to the passage of a scale division part an index and enable the passages to be counted are known and will be used, e.g. a microscope with a slit and photoelectric cell in place of the usual eyepiece.

It will be understood that the general layout can be varied and additional mirrors used where necessary to carry the beam round obstructions. Also that the mirrors 27, 28 in FIGURES 1 to 5 or the mirrors 31, 32 in FIGURE 2 might be replaced by any equivalent optical system which will return a beam in a path parallel to its original path, such as a corner cube reflector or a cat's eye reflector.

We claim:
1. Apparatus for the measurement of the spacing of divisions of a scale comprising an optical maser serving as a source of radiation and including mirror means defining a resonant cavity for said maser, a mirror located external to said resonant cavity and located in the beam of radiation emitted by said maser to reflect at least a part of the beam incident upon it back into the resonant cavity, a movable carriage movable in a predetermined path, said mirror being operatively connected to said apparatus such that upon movement of the carriage the carriage moves axially of said beam to produce relative movement between said mirror and said cavity to vary the total length of the path of said beam as the carriage moves so that a cyclic variation in the radiation emitted by said maser constituting an interference effect is produced as said carriage moves, means for moving said carriage to vary the total length of the path of said beam, detecting means for detecting the emitted radiation, counting means operatively coupled to said detecting means for counting the cycles of interference effect as the total path length of said beam is varied, and means for locating said scale divisions, said means for moving the carriage being coupled to said means for locating the scale divisions, whereby the number of cycles counted by said counting means indicates the spacing of the scale divisions.

2. Apparatus according to claim 1, comprising means for producing relative movement between the scale and an index, such relative motion being precisely related to the variation in the path length of said beam, and means for counting the passage of the scale divisions in relation to the index.

3. Apparatus according to claim 2 comprising means linking together the means for moving said carriage and the means for producing relative movement between the scale and index, and means within the linking means for effecting a change in at least one of the relative directions, nature and scale of the two movements.

4. Apparatus according to claim 2 wherein said means for producing relative movement between the scale and index are directly linked to effect and share the same movement.

5. Apparatus according to claim 2 wherein said carriage displaces the scale longitudinally in relation to the index and parallel to the direction of said beam of radiation emitted by said maser, and the apparatus also includes an optical system carried by said carriage to return said beam parallel with itself whereby the length of the path of said beam between two points in its path respectively preceding and succeeding said optical system is varied in exact relationship to the displacement of the scale, said mirror which reflects at least part of said beam into the lasing medium being fixed in a position succeeding said optical system.

6. Apparatus according to claim 1 wherein said mirror is carried by said carriage, the apparatus also including a second carriage, an index on said second carriage, means for displacing said second carriage to displace the index in the appropriate path in relation to the scale, means for counting the passage of the index in relation to the scale divisions, and means for correlating the displacements of the two carriages.

References Cited
UNITED STATES PATENTS 3,220,111  11/1965  Sakurai.
3,326,078  6/1967  Clark et al.

JEWELL H. PEDERSEN, Primary Examiner

O. B. CHEW II, Assistant Examiner

U.S. Cl. X.R.

356—156